April 7, 1970    G. VON VICK    3,505,634
DIFFERENTIAL PRESSURE TRANSDUCER
Filed Nov. 21, 1967

INVENTOR.
GEORGE VON VICK
BY
Gordon H. Telfer
ATTORNEY

United States Patent Office 3,505,634
Patented Apr. 7, 1970

3,505,634
DIFFERENTIAL PRESSURE TRANSDUCER
George Von Vick, 160 Robin Way,
Los Gatos, Calif. 95030
Filed Nov. 21, 1967, Ser. No. 684,842
Int. Cl. G01l 13/06
U.S. Cl. 338—4                                   7 Claims

ABSTRACT OF THE DISCLOSURE

A transducer for providing an electrical signal indicating the pressure difference between two fluid media includes a flexible diaphragm having strain gage elements on its surfaces within the different fluid media whose pressure difference is to be measured. Positioning of the strain gage elements at the periphery of the diaphragm surfaces provides minimal sensitivity to applied line pressures. Protection from the fluid media is provided by a layer comprising inert organic material such as one from the class of hexafluoropropylene copolymers that may inclue a metallic oxide carrier.

BACKGROUND OF THE INVENTION

Field of the invention

This invention relates to pressure indicating means, and particularly to a transducer for measuring the difference in pressure between different fluid media by the effect of the media on a flexible diaphragm having strain gage elements thereon.

Description of the prior art

Transducers including flexible members having strain gages are well known for fluid pressure measurement. However, it is generally the case that such transducers provide only an indication of pressure with respect to the atmosphere. Where it is desired to provide a reading of the difference in pressure between different nonatmospheric fluid media, particularly where such pressure differences may be small while the absolute pressures may be large, the prior art has failed to provide an efficient unitary means and has resorted to the use of two different transducers in the two media of interest or has required a double bellows or other relatively complex arrangement.

SUMMARY OF THE INVENTION

This invention has among its purposes to provide a differential pressure transducer requiring only a single diaphragm with an arrangement of strain gage elements to provide high sensitivity in reading the difference in pressure of fluid media on opposite surfaces of the diaphragm and with the ability to protect the strain gage elements from media which might attack them.

The foregoing and additional purposes have been achieved through the provision of a transducer that comprises a flexible diaphragm secured at its periphery and having opposing surfaces exposed to different fluid media. A plurality of strain gage elements are mounted on the diaphragm responsive to strains created by the fluid media. Preferably, two strain gage elements are on each side of the diaphragm electrically connected in a Wheatstone bridge configuration. Protection from the media is provided by a covering layer comprising organic or ceramic material that is inert in the media. This may be from the class of hexafluoropropylene copolymers such as vinylidene fluoride hexafluoropropylene copolymer to which a metallic oxide, such as magnesium oxide, may be added as a carrier for improving thermal conductivity while maintaining electrical insulative properties of the layer.

High sensitivity of the transducer is achieved by having the strain gage elements disposed at the extreme periphery of the diaphragm surfaces at least half the radius from the center and, preferably, at least eight tenths of the radius. No strain gage elements are disposed in the center of the diaphragm. In fact, preferred embodiments include those in which a massive button is disposed in the center of the diaphragm to insure essentially restricted movement therein.

BRIEF DESCRIPTION OF THE DRAWING

Additional features and advantages of the present invention will be apparent by referring to the following description taken with the accompanying drawing wherein.

DESCRIPTION OF THE PREFERRED EMBODIMENTS

Figure 1:
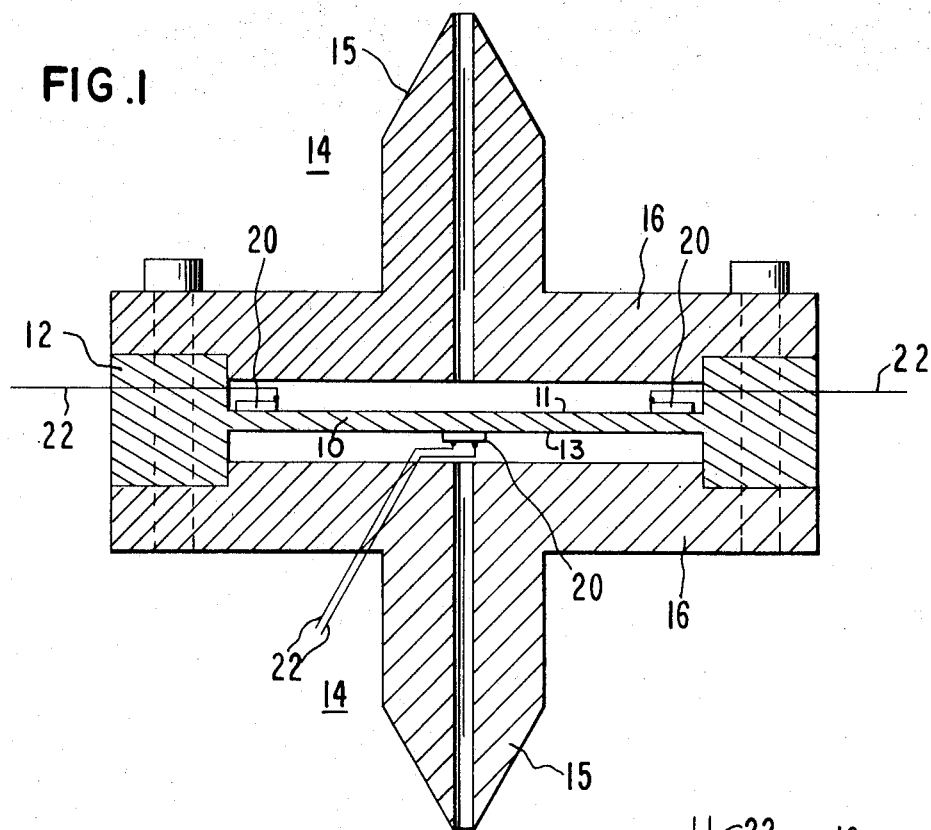
FIG. 1 is a cross-sectional view of a pressure transducer in accordance with the present invention.

Referring now to FIG. 1 there is shown a pressure transducer in accordance with this invention. It comprises a diaphragm 10 supported at its periphery by an annular body 12 which may be integral therewith and machined, from the same original material or may be otherwise physically secured thereto. The body 12 and diaphragm 10 have on each side a pressure port 14 for permitting access by different fluid media to the opposing surfaces 11 and 13 of the diaphragm. The pressure ports each include a tubular member 15 having an aperture extending therethrough and a portion 16 approximately concentric with the diaphragm and body to provide an overpressure stop to prevent extreme motion of the diaphragm.

Figure 2:
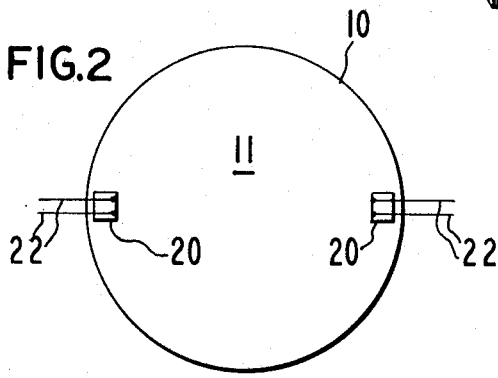
FIGS. 2 and 3 are, respectively, top and bottom views of the diaphragm of the transducer of FIG. 1.
Figure 3:
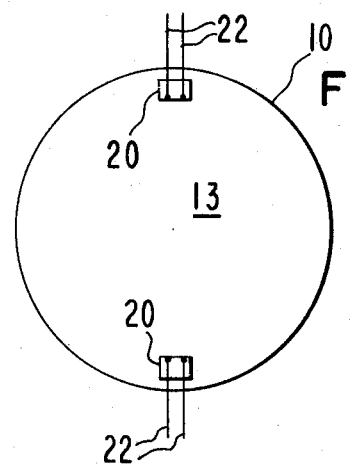

Strain gage elements 20 are disposed on opposing surfaces 11 and 13 of the diaphragm as shown in FIG. 1 as well as FIGS. 2 and 3. The preferred arrangement is one in which a pair of elements on each surface are disposed, perpendicularly with respect to each other. For maximum sensitivity in accordance with this invention the elements 20 are disposed at the extreme periphery of the diaphragm at least one half the radius of the center and preferably at least about eight tenths of the radius. It is found sensitivity is improved by providing the elements 20 with their electrical leads 22 therefrom on the inside toward the diaphragm center. The strain gage elements may be connected into a conventional Wheatstone bridge type configuration. If desired, a radius may be used between the body 12 and diaphragm 10 for positioning the elements during manufacture to insure symmetrical response in the event the diaphragm surfaces are not perfectly parallel.

The construction and selection of materials for various elements of the diaphragm will be generally apparent to those skilled in the art. The strain gage elements may be either semiconductor or foil type and preferably as small as possible for maximum advantage at the periphery of the diaphragm.

This type of transducer employs a pressure sensitive diaphragm with stress null zone oriented bridge pattern. The strain gage elements 20 may be insulated by known means from the diaphragm itself using a known type of ceramic material such as aluminum oxide or magnesium oxide that may be applied by known techniques such as sputtering. (Layer 26, FIG. 4.) The resistance of the legs of the strain gage bridge changes as a function of the pressure induced strain to provide a measure of the difference in pressure on opposing surfaces. When an edge clamp flexible diaphragm as used here is subjected to differential force it is stressed in compression in some areas and directions and in tension in other areas and directions. Compound stresses occur such that portions of the diaphragm are under substantial radial and/or tangential tensile stresses.

Figure 4:
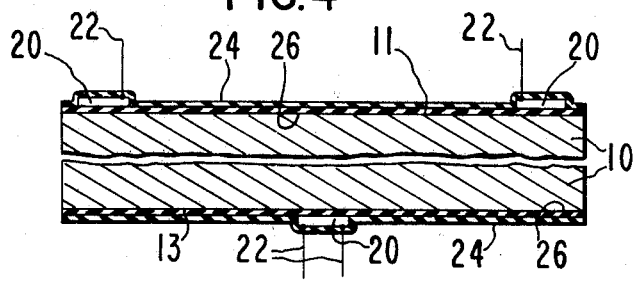
FIG. 4 is an enlarged cross-sectional view of a diaphragm for use in the present invention having protected strain gage elements thereon.

Of importance in this type of transducer is adequate protection of the strain gage elements 20 from the fluid media to which they may be exposed. In accordance with this invention, as shown in FIG. 4, this is provided by depositing over the strain gage elements 20 a layer 24 of protective material that may be an inert organic material such as one selected from the class of vinyl polymers. Layer 26 is disposed directly on the diaphragm for insulation of the elements. Layer 24 is disposed over the strain gage elements on both diaphragm surfaces. A suitable example is a vinylidene fluoride hexafluoropropylene copolymer such as is available under the tradename Viton A from the DuPont Chemical Company. This material, which is a highly viscous fluid, may have mixed with it a metallic oxide carrier for providing improved thermal conductivity. Suitable carriers include magnesium oxide and aluminum oxide. Successful layers have been formed by mixing with a quantity of five parts of the copolymer from ½ to 1½ parts by weight of magnesium oxide and is found highly resistant to all fluid media including highly acidic ones. The thickness of layer 24 may be about 1 to 2 mils.

Where it is necessary for the transducer to operate in a radiation environment that would adversely affect the performance or life of the strain gage elements, a protective layer 24 with radiation resistant qualities may be used. Such a layer may comprise a ceramic of a metal oxide such as aluminum oxide or magnesium oxide applied by a known technique such as flame spraying.

While the present invention has been shown and described in a few forms only, it will be apparent that various changes and modifications may be made without departing from the spirit and scope thereof.

I claim:
1. A differential pressure transducer comprising:
   a flexible diaphragm secured at its periphery, said diaphragm having opposing surfaces, each surface being covered by a first layer of an electrically insulating material and a second layer of protective material suitable for exposure to different fluid media;
   a plurality of strain gage elements mounted between said first and said second layers on both sides of said diaphragm so as to be responsive to strains created by said fluid media on said diaphragm, said plurality of strain gage elements including at least on element on each side of said diaphragm, all of said strain gage elements being disposed at least half the distance from the center to the edge of said diaphragm.
2. Structure of claim 1 wherein said layer of protective material is a layer of ceramic material.
3. A differential pressure transducer comprising:
   a flexible diaphragm secured at its periphery, said diaphragm having opposing surfaces for exposure to different fluid media;
   a plurality of strain gage elements responsive to strains created by said fluid media on said diaphragm, said plurality of strain gage elements being mounted on said opposing surfaces of said diaphragm, and including a pair of strain gages on each of said surfaces, each pair being perpendicularly disposed with respect to the other pair on the opposite surface, said strain gage elements being positioned only on those portions of said surfaces at least one half the radius of said surfaces from the center thereof.
4. A differential pressure transducer comprising:
   a flexible diaphragm secured at its periphery, said diaphragm having opposing surfaces for exposure to different fluid media; and
   a plurality of strain gage elements mounted on said diaphragm responsive to strains created by said fluid media on said diaphragm, said plurality of strain gage elements including at least one on each of said opposing surfaces disposed at least half the distance from the center of said diaphragm and exposed to said media, said strain gage elements being protected from said media by a layer of material inert in said media, said material comprising a mixture of vinylidene fluoride hexafluoropropylene copolymer and magnesium oxide.
5. A pressure transducer comprising: a flexible diaphragm; a plurality of strain gage elements mounted on said diaphragm and protected from fluid media by a layer of a mixture of vinylidene fluoride hexafluoropropylene copolymer and at least one metal oxide.
6. A pressure transducer comprising:
   a flexible diaphragm;
   a plurality of strain gage elements mounted on said diaphragm and protected from fluid media by a layer of a mixture of vinylidene fluoride hexafluoropropylene copolymer and at least one metal oxide which is a member of the class consisting of magnesium oxide and aluminum oxide.
7. The subject matter of claim 6 wherein:
   said metal oxide comprises magnesium oxide of which about one-half part to one and one-half parts by weight are mixed with each five parts by weight of said copolymer.

References Cited
UNITED STATES PATENTS

| | | | |
|---|---|---|---|
| 3,035,240 | 5/1962 | Starr | 338—4 |
| 3,242,449 | 3/1966 | Stedman | 338—2 |
| 3,315,201 | 4/1967 | Werme | 338—2 |
| 3,341,794 | 9/1967 | Stedman | 338—4 |
| 2,507,501 | 5/1950 | Clark. | |

OTHER REFERENCES

The Strain Gage Primer, by C. C. Perry and A. R. Lissner, 2nd ed. (1962) McGraw-Hill Book Co., New York, pp. 175–182.

REUBEN EPSTEIN, Primary Examiner

U.S. Cl. X.R.

73—398